Patented June 10, 1924.

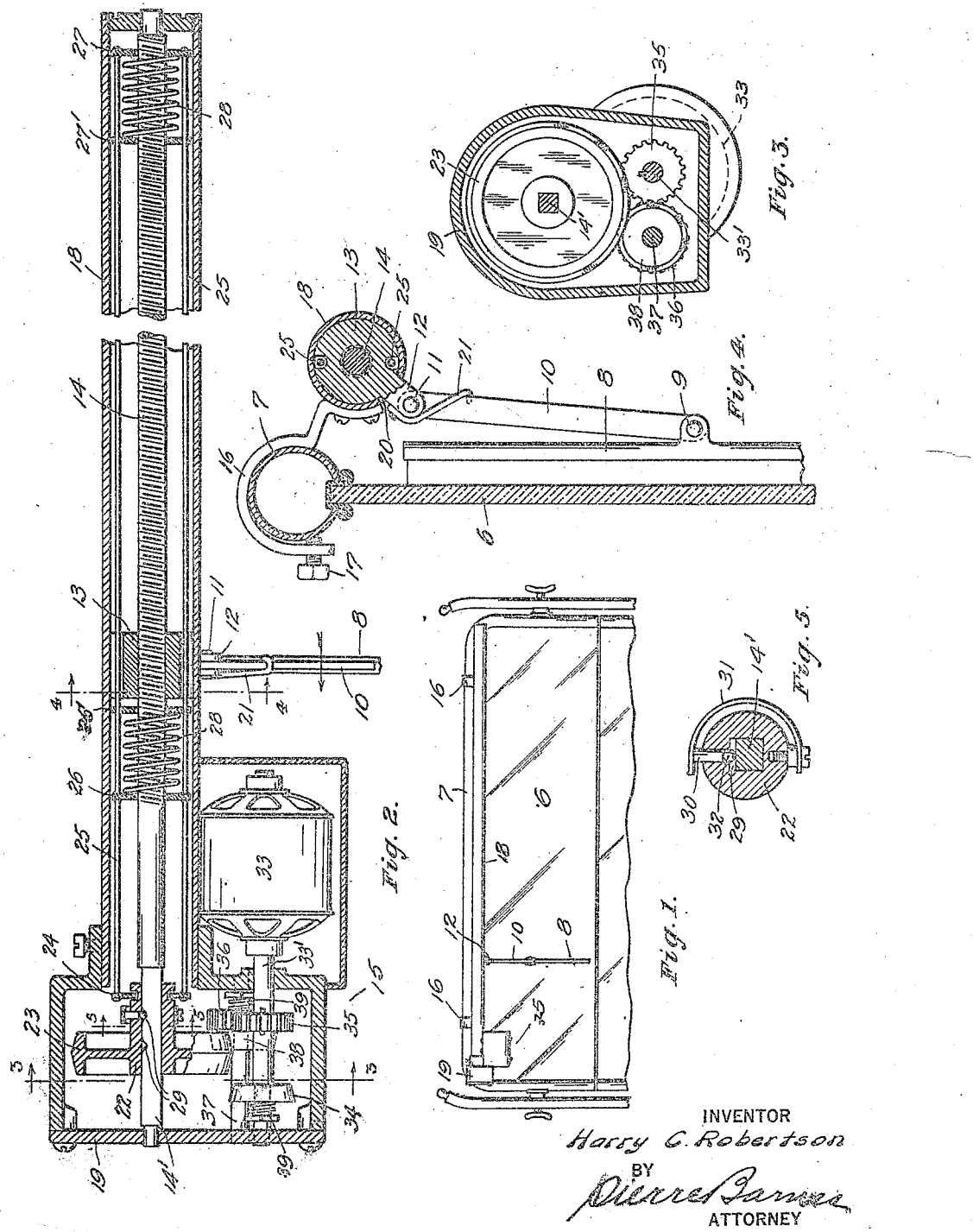

1,497,405

UNITED STATES PATENT OFFICE.

HARRY C. ROBERTSON, OF SEATTLE, WASHINGTON.

POWER-OPERATED WINDOW-CLEANING DEVICE.

Application filed November 14, 1921. Serial No. 514,871.

*To all whom it may concern:*

Be it known that I, HARRY C. ROBERTSON, a citizen of the United States, residing at Seattle, in the county of King and State of Washington, have invented certain new and useful Improvements in Power-Operated Window-Cleaning Devices, of which the following is a specification.

This invention relates to power operated devices for removing accumulations of rain, snow, or the like from the windows or windshields of automobiles or other vehicles.

The object of the present invention is the perfecting of window cleaning devices of this character.

The invention in its preferred embodiment is illustrated in the accompanying drawings, in which:

Figure 1 is a front elevation of the upper portion of a windshield with my window-cleaning device applied thereto. Fig. 2 is a view, partly in elevation and partly in longitudinal section of the device to an enlarged scale. Figs. 3, 4, and 5 are detail sectional views taken substantially through 3—3, 4—4 and 5—5 of Fig. 2.

In said drawings, the reference numeral 6 represents a windshield glass rigidly secured in a frame 7. According to my invention I provide in front of the windshield a squeegee 8 which is pivotally connected at 9 to the lower end of a link 10 whose upper end is connected by a pivot 11 to an arm 12 of a nut 13. This nut is mounted to travel on a horizontal screw shaft 14 provided in a casing indicated, generally, by 15 and rigidly secured to the windshield in any suitable manner as, for example, by means of hook elements 16 extending over the windshield frame and clamping screws 17 as shown in Fig. 4.

Said casing is composed, preferably, of a tubular member 18 which extends laterally from a member 19 which serves as a housing for the mechanism by which the screw shaft 14 is driven to propel said nut. Said shaft extends through both of the casing members. The tubular casing member 18 is provided with a longitudinal slot 20, Fig. 4, through which the nut arm 12 extends. 21 represents a spring secured to the arm 12 and serving to yieldingly press the squeegee 8 against the front surface of the windshield glass. The part $14^1$ of shaft 14 within the casing member 19 is desirably square in transverse section and extends through a correspondingly shaped aperture in the hub 22 of a friction wheel 23 which is shiftable axially of the shaft through the instrumentality of the nut 13 when the latter is in proximity of the ends of its travel on said shaft. The mechanism shown for accomplishing such shifting movements of said wheel comprises an annular collar 24 engaging in a peripheral groove in the wheel hub and rigidly connected by rods 25 with yokes 26 and 27, one at each side of the nut and adjacent to the ends of the threaded portion of the shaft. Cooperating with the yokes are collars $26^1$ and $27^1$ and helical springs 28 interposed between the yokes and the adjacent collars.

The shaft part $14^1$ is provided with spaced notches 29 for engagement with latch devices carried by the wheel 23 for releasably securing the same in predetermined positions. As best shown in Fig. 5, said latch devices consist of a stud 30 extending through a bore in hub 22 and is acted upon by a spring 31 to yieldingly retain a ball 32 in engaged relations with one or the other of said notches when the wheel is suitably shifted by the nut encountering the collars $26^1$ or $27^1$ to transmit motion through the associated spring 28 and yoke 26 or 27 and rods 25 to the wheel collar 24. For driving the screw shaft to impart motion through the medium of the nut to the squeegee I employ an electric motor 33 having on its shaft $33^1$ a friction pinion 34, Fig. 2, and a spur pinion 35 which latter is in continuous mesh with a spur gear 36 on an intermediate shaft 37. This intermediate shaft also has mounted thereon a friction pinion 38. The friction pinions 34 and 38 are disposed at opposite sides of the friction wheel 23 and arranged to be engaged thereby when the wheel is shifted as explained above. The wheel and pinions therefor are desirably provided with conoidal peripheral surfaces and the pinions splined to the respective shafts and respectively held in engageable positions as by means of springs 39.

In operation, the motor shaft $33^1$ acts through spur gears 35 and 36 to drive the intermediate shaft 37 in an opposite direction from the motor shaft thereby causing the friction pinions 34 and 38 to be driven in opposite rotary directions. Assuming the friction wheel 23 to be in engaged relations with the pinion 38 to cause the screw shaft 14 to effect the travel of the nut 13 and the squeegee toward the left hand side of Fig. 2. When the nut encounters collar 26¹ the adjacent spring 28 is compressed against yoke 26 until it accumulates power sufficient to displace latch ball 32 from the notch 29 wherein it is engaged and transposes it to the other notch by axially shifting the wheel 23. When this occurs the wheel 23 is removed from its frictional engagement with the pinion 38 into engagement with the other pinion 34 whereby the rotation of the screw shaft is reversed whereupon the nut and squeegee are propelled toward the right until arrested by the shifting of the friction wheel which is effected by the nut 13 actuating the yoke 27.

From the above description it will be noted that the reciprocation of the squeegee in the present invention is obtained by means of reversing mechanism from a motor shaft which is driven in a single rotary direction.

What I claim is,—

1. In a window cleaning device, a horizontally disposed screw shaft, a nut thereon adapted to carry a cleaning element, a motor, a shaft intermediate the motor shaft and the screw shaft, gear connections between the motor shaft and the intermediate shaft for rotating the latter in opposite direction from the motor shaft, pinions provided on the motor and intermediate shafts, a gear wheel mounted on said screw shaft, means actuated by the travel of said nut whereby said gear wheel is engaged alternately with said pinions whereby the rotation of the screw shaft is reversed to effect the reciprocation of said nut.

2. In a window cleaning device, a horizontally disposed screw shaft, a nut taking thereon adapted to carry a cleaning element, a friction wheel mounted on said shaft to rotate therewith and arranged for axial movements relative thereto, a power shaft, a friction pinion mounted on said power shaft, a shaft intermediate the power shaft and the screw shaft, a friction pinion mounted on said intermediate shaft, operative connections between said power shaft and the intermediate shaft for rotating the latter in a direction opposite to that of the motor shaft, and means rendered operable by the nut when near the ends of its travel on said screw shaft whereby the friction wheel is shifted into engaged relations with said pinions alternately to effect reversed rotary movements of the screw shaft whereby said nut is reciprocated.

3. In a window cleaning device, a horizontally disposed screw shaft, a nut taking thereon adapted to carry a cleaning element, a friction wheel mounted on said shaft to rotate therewith and arranged for axial movements relative thereto, a power shaft, a pinion mounted on said power shaft, a shaft intermediate the power shaft and the screw shaft, a pinion mounted on said intermediate shaft, operative connections between said power shaft and the intermediate shaft for rotating the latter in a direction opposite to that of the power shaft, yokes provided at opposite sides of said nut, rods rigidly connected to said yokes, operative connections between said rods and said wheel, resilient means engageable by said nut whereby the yokes are influenced to shift the wheel into engagement with each of said pinions alternately for driving the screw shaft to afford reciprocatory movements to the nut.

Signed at Seattle, Washington, this 3rd day of November 1921.

HARRY C. ROBERTSON.

Witnesses:
 PIERRE BARNES,
 MARGARET G. SUPPLE.